May 2, 1933.  W. D. HODSON  1,907,258
GEAR LUBRICATION
Filed March 23, 1929
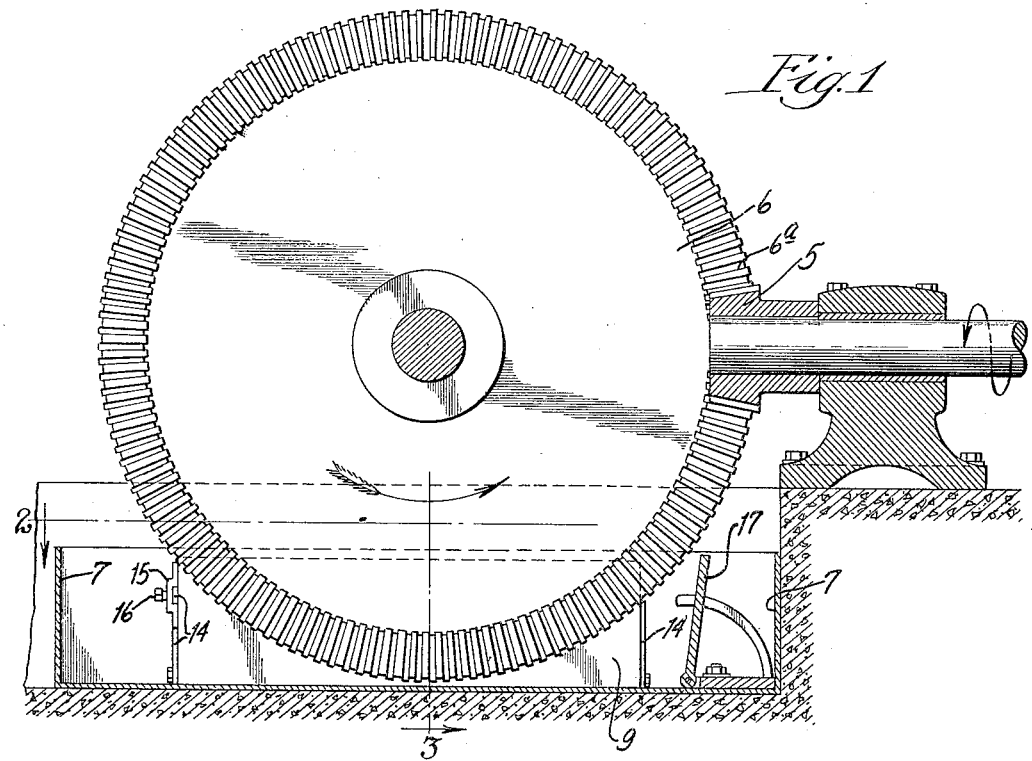
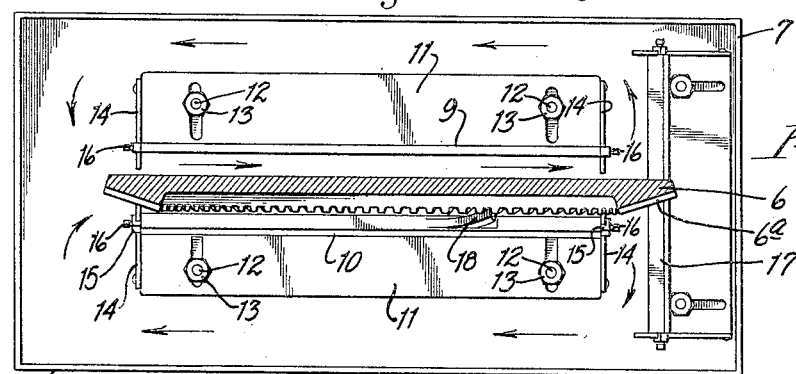
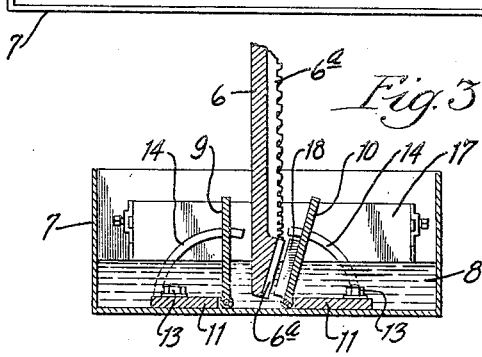
Inventor:
Walter D. Hodson, Patented May 2, 1933

1,907,258

UNITED STATES PATENT OFFICE

WALTER D. HODSON, OF CHICAGO, ILLINOIS, ASSIGNOR TO THE HODSON CORPORATION, OF CHICAGO, ILLINOIS, A CORPORATION OF DELAWARE

GEAR LUBRICATION

Application filed March 23, 1929. Serial No. 349,411.

The present invention relates to the lubrication of gearing, and is particularly adapted to the lubrication of large diameter gears, such as the reduction gears used in steel rolling and billet mills. It will be fully understood from the following description, illustrated by the accompanying drawing, in which:

Figure 1 is a longitudinal vertical section illustrating an embodiment of the invention in connection with a reduction gear;

Fig. 2 is a horizontal section on the line 2 of Fig. 1; and

Fig. 3 is a vertical detail section on the line 3 of Fig. 1.

In the lubrication of heavy duty reduction gears, such as those employed in steel mills, great difficulty has hitherto been experienced, since the size of the gears has made it impractical to immerse the gearing in lubricants up to the level at which intermeshing of the gears takes place. This is particularly true in steel mill operations, where, as illustrated in Figure 1, the driven gear may be 8 to 10 feet in diameter, and a very heavy, viscous and expensive lubricant is required on account of the conditions of operation. It has hitherto been the practice to lubricate such gears by a direct application of a stream or a pool of lubricant to the gears at their point of intermeshing.

In accordance with the present invention, I am able to effect a complete and adequate lubrication of gears of this general character by means of a relatively shallow pool of oil or a pool of any depth into which only the lower portion of the larger, vertically positioned gear dips. The drawing illustrates an embodiment of the invention, but it is readily apparent that the invention is not limited to the specific details shown therein.

Referring to the drawing, the numeral 5 indicates a bevel drive gear, which intermeshes with the bevel gearing on a vertical face of the large diameter-reduction gear 6. Below this gear there is provided the shallow pan 7 containing the lubricant indicated by the numeral 8, the normal level of which need be sufficiently high to cover only a portion of the teeth 6ª on the face of the gear.

Parallel to the direction of movement of the gear and on each side thereof I provide the vertical plates or guide members 9 and 10, the numeral 10 indicating the guide member adjacent the toothed face of the gear. These guide members are mounted so as to permit adjustment toward and from the gear and also an adjustment as to their angle with the gear. For this purpose, the guide plates 9 and 10 may suitably be hinged to the movable, slotted plates 11. Through the slots in the latter pass threaded pins 12 secured to the bottom of the tray or container 7, and after suitable adjustment, the plates 11 are secured in position by tightening the nuts 13. The plates 11 may obviously be adjusted parallel or in angular relation to the plane of the gear. The plates 11 are likewise provided with the arcuate slides 14 which pass through guide slots formed on the guide plates 9 and 10, the latter being secured in the desired angular position by tightening the machine screws 16. It will be readily apparent from the construction above described that the guide plates 9 and 10 may be moved toward or from the gear 6 and that their relative angular adjustment may be varied. Thus, as shown in Fig. 3, the guide plate 9 at the back of the gear may be substantially vertical and parallel to the plane of the gear, and the guide plate 10 may be in close proximity to the bevel teeth of the gear and adjusted to approximate parallelism therewith.

The guide plates 10 and 11 terminate at substantial distances from the rear and front of the pan or tray 7, as shown clearly in Figs. 1 and 2. These guide plates thus form a confined path in the pan or tray through which the gear moves, and the movement of the gear causes a forward flow of the lubricants in this confined path or channel. In advance of the gear, in the direction of flow of the lubricant in this confined channel, the intercepting plate or dam 17 is provided. It extends transversely of the pan or tray and is mounted for horizontal and angular adjustment in the same manner as are the guide plates 9 and 10. The intercepting plate or dam 17 extends for a sufficient distance on each side of the line of plates 9 and 10 to divert the flow of the lubricant to the sides and back to the rear of the tray 7. It will thus be seen that, by the guide plates 9 and 10 and the intercepting plates 17, the motion of the gear causes the lubricant to flow in a confined channel adjacent the gear in the direction of movement of the gear and then to turn and travel in the reverse direction around the plates 9 and 10 and back to the other end of the pan, to be again recirculated by the action of the gear. The viscous nature of the lubricant causes it to pile up to a substantial extent within the channel between the plates 9 and 10 as it approaches the intercepting plate 17, and the level of the lubricant is maintained so that, by such piling-up action, the face of the gear teeth is adequately covered.

If desired, suitable means may be provided for causing the flow of the lubricant to lift a portion thereof to a higher level, so that the face of the teeth can be adequately provided with lubricant while maintaining a lower normal level of lubricant in the pan or tray. Thus, a tongue 18 may be formed in the plate 10, for example, by slitting out three sides of a rectangle, and this tongue may be bent inwardly toward the teeth of the gear (but not touching the latter), the lower portion thereof approaching closer to the teeth of the gear than does the upper. This tongue causes the grease, in the flow induced by the movement of the gear, to rise upwardly on the face of the gear and thereby permit an adequate lubrication of its teeth with a smaller amount of grease.

It is readily apparent that the present invention is applicable to vertical gears and to obliquely disposed gears in a generally vertical direction at which the described action takes place, and the term "vertically disposed", as used hereinafter, is intended to include such vertical and obliquely disposed gears.

I claim:

1. In apparatus for the lubrication of vertically disposed gears, a container for lubricant, the lower portion of the gear dipping below the liquid level therein, a plate in said container on the toothed side of the gear extending in the direction of movement of the gear, means for adjusting said plate toward or from the gear, said plate forming a guide for the flow of lubricant induced by the movement of the gear, an intercepting dam in said container in advance of the gear to intercept and divert the flow of lubricant, causing it to pile-up on the teeth of the gear and to return for recirculation past the guide plate, and means for adjusting said intercepting plate toward and from the gear.

2. In apparatus for the lubrication of vertically disposed gears, a container for lubricant, the lower portion of the gear dipping below the liquid level therein, a guide plate on the toothed side of the gear and extending in the direction of movement thereof to form a confined channel through which the movement of the gear causes lubricant to flow, and a projecting member formed on said plate and extending toward the teeth of the gear to cause lubricant to rise on said teeth, and an intercepting plate in said container in advance of the gear, said intercepting plate causing lubricant to pile-up against the teeth face of the gear and diverting the flow of the lubricant, thereby causing it to return for recirculation through the channel formed by said guide plate.

WALTER D. HODSON.